United States Patent
Falardeau et al.

(10) Patent No.: US 11,537,697 B2
(45) Date of Patent: Dec. 27, 2022

(54) AUTHENTICATION SYSTEM AND METHOD

(71) Applicant: Nuance Communications, Inc., Burlington, MA (US)

(72) Inventors: Simon Falardeau, Quebec (CA); Thomas Stanton, Winchester, MA (US)

(73) Assignee: Nuance Communications, Inc., Burlington, MA (US)

( * ) Notice: Subject to any disclaimer, the term of this patent is extended or adjusted under 35 U.S.C. 154(b) by 309 days.

(21) Appl. No.: 16/538,099

(22) Filed: Aug. 12, 2019

(65) Prior Publication Data

US 2021/0049249 A1   Feb. 18, 2021

(51) Int. Cl.
*G06F 21/32* (2013.01)
*G06F 21/62* (2013.01)

(52) U.S. Cl.
CPC .......... *G06F 21/32* (2013.01); *G06F 21/6245* (2013.01); *G06F 2221/2139* (2013.01)

(58) Field of Classification Search
CPC .... G06F 21/32; G06F 21/316; G06F 21/6245; G06F 2221/2139
See application file for complete search history.

(56) References Cited

U.S. PATENT DOCUMENTS

| | | | | |
|---|---|---|---|---|
| 10,693,872 | B1* | 6/2020 | Larson | H04L 9/3228 |
| 2012/0254941 | A1* | 10/2012 | Levien | G06F 21/32 |
| | | | | 726/3 |
| 2016/0132721 | A1* | 5/2016 | Bostick | G06F 21/6254 |
| | | | | 382/118 |
| 2021/0239488 | A1* | 8/2021 | Yamamoto | G01C 21/3697 |

* cited by examiner

*Primary Examiner* — Daniel B Potratz
(74) *Attorney, Agent, or Firm* — Brian J. Colandreo; Michael T. Abramson; Holland & Knight LLP

(57) ABSTRACT

In accordance with aspects of the inventive concepts, a system and method provide ongoing authentication through processing of data that includes biometric data. Such systems and methods can use, as examples, face recognition and/or voice biometric data, or other biometric data, to identify the user in real-time and thereafter during an ongoing session. In various embodiments, the system can continuously or repeatedly authenticate one or more users using biometric data to control access to information and/or functions in real (or near real) time. The system can be configured to optimize and/or minimize resource consumption associated with the ongoing authentication process.

20 Claims, 7 Drawing Sheets

AUTHENTICATION SYSTEM AND METHOD

FIELD OF INTEREST

The present inventive concepts relate to the field of computer systems requiring some form of user authentication.

BACKGROUND

There exist many forms of user authentication systems providing different levels of security for user access to a computer system, an application, a network, a facility, or equipment, as examples. Various types of user authentication systems and methods require some form of user input or inputs via one or more forms of user input mechanisms. Such user input mechanisms can include a touch-sensitive keyboard or keypad, login fields, a microphone, or a camera, as examples. Some common forms of user authentication include username and password inputs into login field of a computer display. Other types of user authentication systems can require use of other types of mechanisms in the user's possession, such as keys or radio frequency identification (RFID) devices. Other types of user identification and/or authentication devices can read biometric inputs, and can include retinal scanners, fingerprint scanners, or face recognition devices. With any of the foregoing, once authentication is initially achieved, access persists indefinitely until the user ceases access (e.g., logout) or until a system timeout due to inactivity.

There are many different approaches to authentication, and many have associated vulnerabilities and risks. Some systems impose certain password requirements on users when creating a password, such as imposing a minimum character length and special character, letters, and number requirements. Some systems automatically require a change of password periodically to enhance security. Some systems impose an independent form or authentication provided over a second channel, e.g., two-factor authentication.

Security risk pain points associated with systems and mechanisms that rely on human actions, unsafe devices include: weak password, password theft or sharing, not securing a device when stepping away from it, password saved in cache on a shared device, lost keys, keyless system security risks (hacking the signal), office passes lost or stolen, having to re-authenticate when a timeout occurs, forgot phone containing RSA Authentication application.

Biometrics are used today to unlock devices, most often mobile devices. Biometrics in this case is only a replacement for the typing in the antiquated username/password combination, with limitations including: the user is fixed, multi-user support does not exist, and once unlocked, the device is then unsecure and exposed for a "timeout period", which allows full access to an unauthorized user.

It would be advantageous to have an authentication system that was far less vulnerable to such risks, and one that preferably significantly mitigated risk post-authentication.

SUMMARY

In accordance with aspects of the inventive concepts, a system and method provide ongoing authentication through processing of data that includes biometric data. Such systems and methods can use, as examples, face recognition and/or voice biometric data, or other biometric data, to identify the user in real-time and thereafter during an ongoing session, or in-session. In various embodiments, the system can continuously or repeatedly authenticate one or more users using biometric data to control access to information and/or functions in real (or near real) time. The system can be configured to optimize and/or minimize resource consumption associated with the ongoing authentication process.

In accordance with aspects of the inventive concepts, provided is an authentication method carried out by at least one computer processor executing computer program code. The method comprising providing a computer system including system authentication information that includes biometric data for one or more users and authorization data associated with each of the one or more users, the authorization data indicating user rights associated with protected resources. The method further includes, during a computer session, receiving biometric data from one or more biometric sensors for at least one user, authenticating the at least one user if the received biometric data corresponds to system biometric data, and electronically enabling access to one or more of the protected resources by the at least one authenticated user based on system authorization data associated with the at least one authenticated user.

In various embodiments, receiving the biometric data for the at least one user includes intermittent monitoring for biometric data.

In various embodiments, receiving the biometric data for the at least one user includes continuous monitoring for biometric data.

In various embodiments, receiving the biometric data for the at least one user includes real-time monitoring for biometric data.

In various embodiments, authenticating the at least one user is responsive to a clock-driven trigger.

In various embodiments, authenticating the at least one user is responsive to an event-driven trigger.

In various embodiments, the event-driven trigger includes determining the presence of a new user based on the received biometric data and/or determining the absence of a previously authenticated user based on the received biometric data.

In various embodiments, the authenticating includes processing the received biometric data for at least one of voice recognition, face recognition, eye movement detection, retinal scan, and/or fingerprint, thumbprint, or palm print detection.

In various embodiments, the method further comprises, if more than one user is authenticated, determining if any of the authenticated users is a newly authenticated user and, if so, modifying and/or disabling access to the protected resources based on the system authorization data associated with the newly authenticated user.

In various embodiments, the method further comprises outputting content from the protected resources to at least one display and the modifying or disabling access to the protected resources includes obfuscating or closing at least some of the displayed content on the at least one display.

In accordance with another aspect of the inventive concepts, provided is an authentication system that comprises computer storage including system authentication information that includes biometric data for one or more users and authorization data associated with each of the one or more users, the authorization data indicating user rights associated with protected resources and at least one processor. The at least one processor is configured to repeatedly, during a computer session, receive biometric data from one or more biometric sensors for at least one user, authenticate the at least one user if the received biometric data corresponds to system biometric data, and electronically enable access to one or more of the protected resources by the at least one authenticated user based on system authorization data associated with the at least one authenticated user.

In various embodiments, the at least one processor is configured to drive the biometric sensors to perform intermittent monitoring for biometric data.

In various embodiments, the at least one processor is configured to drive the biometric sensors to perform continuous monitoring for biometric data.

In various embodiments, the at least one processor is configured to drive the biometric sensors to perform real-time monitoring for biometric data.

In various embodiments, the at least one processor is configured to authenticate the at least one user in response to a clock-driven trigger.

In various embodiments, the at least one processor is configured to authenticate the at least one user in response to an event-driven trigger.

In various embodiments, the event-driven trigger includes a determination by the at least one processor of the presence of a new user based on the received biometric data and/or the absence of a previously authenticated user based on the received biometric data.

In various embodiments, the at least one processor is configured to process the received biometric data for at least one of voice recognition, face recognition, eye movement detection, retinal scan, and/or fingerprint, thumbprint, or palm print detection.

In various embodiments, the at least one processor is further configured to, if more than one user is authenticated, determine if any of the authenticated users is a newly authenticated user and, if so, modify and/or disable access to the protected resources based on the system authorization data associated with the newly authenticated user.

In various embodiments, the at least one processor is further configured to output content from the protected resources to at least one display and modify or disable access to the protected resources by obfuscating or closing at least some of the displayed content on the at least one display.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
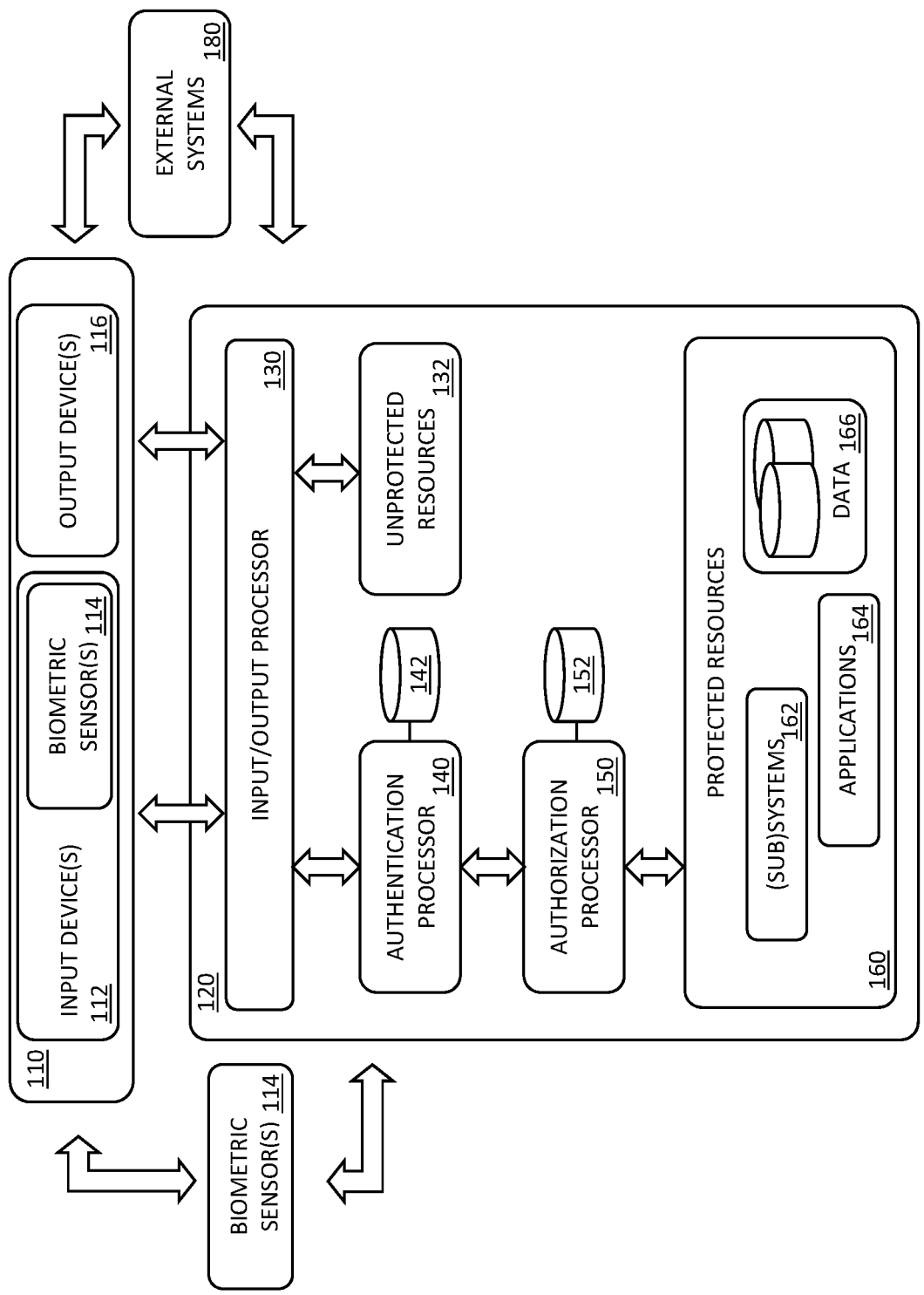
FIG. 1 is an embodiment of an authentication system, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspects of the inventive concepts, a system and a method provide initial and subsequent authentication using at least some biometric data. Once a user is authenticated via a device, authorization to access protected systems, subsystems, and or data is enabled for that user via that device. Initial authentication enables a user (via the device) to gain initial access to protected systems, subsystems, and/or data, according to the authorizations or rights associated with the authenticated user. Subsequent authentication is any one or more authentications that occur after initial authentication and before the user's session is ended, e.g., by logout or time out. Subsequent authentications can be in-session authentications occurring using real-time biometric data, and may be performed without the knowledge of the authenticated user(s). The subsequent biometric data may be collected by one or more biometric sensors or detectors native to the user's device, within the environment of the user, or a combination thereof. After initial authentication, subsequent authentications enable continued access to protected systems, subsystems, and/or data, according to the authorizations or rights associated with the authenticated user.

In some embodiments, the system and method can authenticate the user initially using a first method or technology (e.g., any of a variety of logins, RFID, or keyed entry technologies) and subsequently authenticate the user using biometric data. In some embodiments, the system can perform the subsequent authorizations without indication to the user.

In various embodiments, the subsequent authentication can utilize real-time and/or continuous monitoring of biometric information by one or more biometric sensors, e.g., a camera and/or a microphone. As an example, sensed or detected changes in biometric information can initiate an authentication processor to process the sensed or detected biometric information to attempt to authenticate the individuals present.

The subsequent authentication process(es) can be event driven, scheduled, and or continuous, in different embodiments. Event-driven authentication processes can be responsive to a trigger (or trigger event). As non-limiting examples, a trigger can be detection of a new user; detection of absence of the authenticated user; a change in protection level of the accessed protected systems, subsystems, and/or data; a change in authorizations of the authenticated user(s) with respect to the protected systems, subsystems, and/or data; an attempt to access different protected systems, subsystems, and/or data, detection of utterances or phrases through speech processing, or the opening or closing of a time window. Scheduled authentication processes can be considered to be event driven, where the event is a time or a count indicated by a clock or a signal based on a time or count indicated by a clock. Scheduled authentication processes can be conducted according to a clock frequency or schedule. For example, if a user's authorizations change according to a schedule, then the authentication and authorizations of an already authenticated user can be accomplished in response to the clock or schedule trigger. Continuous authentication processes can be ongoing authentication that continues to be executed during a session, where the completion of an authentication process could be considered a trigger for the next authentication process.

In various embodiments, the authentication system can be configured to process received biometric data for at least one of voice recognition, face recognition, eye movement detection, retinal scan, and/or fingerprint, thumbprint, or palm print detection, as examples. Different types of biometric detectors and/or sensors could be used to collect the biometric data, and to generate signals communicating the received biometric data. Such detectors and sensors could collect, as examples, face, retinal, eye movement, voice and/or fingerprint, thumbprint, or palm print recognition biometrics to identify (authenticate) one or more user at initial access to protected systems, subsystems, and/or data, and thereafter for subsequent access to such protected systems, subsystems, and/or data. The biometric data could be used in combination with other forms of access or entry control, e.g., a password, a passcode, a key, a wireless control device (e.g., a remote starter, RFID device, and so on), and/or a different biometric device. In other embodiments, the biometric data could be used only for subsequent authentication processes.

In various embodiments, after initial authentication, the system can subsequently and/or repeatedly authenticate the user viewing protected data or performing an action using a protect application on a device or system. In various embodiments, the system can accomplish the subsequent and/or repeated authentication on an on-going or continuous basis. In some embodiments, the system can continuously perform biometric monitoring of the authenticated user, which can be used for real-time and/or continuous authentications and/or for event-driven authentications. As examples, the subsequent and/or repeated authentications can be periodic, random, or in response to a change in condition associated with and/or detected by the accessed device or system, e.g., awakening from a sleep mode, closing an application or window on a display, opening a new window of an application or display, saving, creating, changing, and/or deleted data, a change in detected speech, and so on. These could all be event triggers. The system can be configured to optimize and/or minimize resource consumption, particularly in an on-going or continuous authentication process. For example, the system can adjust an authentication schedule or switch from continuous authentication and/or biometric monitoring to event-drive authentication and/or biometric monitoring.

In various embodiments, when the user's subsequent authentication is no longer possible or the authenticated user is no longer authorized to access certain protected resources, sensitive data, as an example, that was previously displayed is obfuscated or hidden or removed and subsequent requests are rejected until reauthentication and/or reauthorization is accomplished. Further, any unauthorized action that is attempted is rejected (e.g., save data on a server or external device, print data, use restricted functionality, request access to sensitive material, etc.). In various embodiments, the system is configured to determine whether or not a user looking at a display screen is allowed to view requested data or perform a given action, for example, when the authenticated user has left his/her workstation or an untrusted (unauthenticated) user is looking over the shoulder, as examples. In a healthcare, research, scientific, and/or laboratory setting, the system can be configured to determine whether a clinician has entered or exited an exam room. Based on such determinations, the system can prevent or limit access to information, systems, or facilities by unauthenticated users and selectively enable access to information, systems, or facilities to authenticated users.

Note, distinguishing between authentication and authorization is important because if a single user is viewing sensitive data and another user enters the environment, the system will transparently authenticate and then authorize the additional user. However, while the system may accurately identify (authenticate) the second user, that second user may not have permission (authorization) to view the displayed sensitive data. In such a case, the system immediately removes, eliminates, obfuscates, or suspends access to the unauthorized sensitive data, thereby securing the data.

FIG. 1 is an embodiment of an authentication system, in accordance with aspects of the inventive concepts. The system 120 of FIG. 1 includes a variety of modules and processors configured to perform authentication processing using biometric information. The system 120 is configured to communicate by any now known of hereafter developed communication technologies with one or more external devices or systems 110, 180.

Authentication system 120 includes an input/output processor 130 configured to communicate with a user device 110 and external systems 180. The input/output processor 130 can implement one or more technologies from a variety of types of wired and/or wireless communication systems, such as cable, optical fibers, nearfield communications systems (e.g., Bluetooth and/or RF), cellular networks, satellite communications systems, and so forth.

External systems 180 can be any of a number of types of systems, including systems comprising protected data and/or functionality. As examples, such systems 180 can include, but are not limited to, medical or patient information equipment, systems or facilities, financial institution equipment, systems or facilities, educational institution equipment, systems or facilities, government equipment, systems or facilities, business equipment, systems or facilities, online gambling systems, and/or personal equipment, systems or facilities.

The user device 110 can take the form of a mobile phone, tablet, or phablet, a laptop computer, a desktop computer, a terminal, an interactive display, an automated teller machine, a kiosk, a security system, an entertainment system, a gaming system, a television, or a vehicle, as examples. The user device 110 can include one or more input devices 112 and one or more output devices 116. The input devices 110 can include one or more of keyboards, keypads, touch screens, joy sticks, handheld controllers, and/or a mouse, as examples. The output devices 116 of the user device 110 can include one or more of a display, a computer screen or monitor, a speaker or other audio output device, a modem, and/or a printer.

The input devices 110 can also include one or more biometric sensors 114, such as a camera, a microphone, a retinal scanner, a finger, thumbprint, or palm reader, an eye movement detector, and so forth. In other embodiments, there can additionally or alternatively be biometrics sensors 114 external to the user device 110, e.g., in the environment of the user and/or the user device. Those external biometric sensors 114 can communicate directly with the authentication system 120 or through the user device 110 to provide biometric information used for initial and/or subsequent authentication using biometric information.

The authentication system 120 includes an authentication processor 140 responsible of at least the subsequent authentication processes and can also be responsible for the initial authentication processes. That is, in some embodiments, one authentication approach could be used for initial authentication, which may or may not include biometric information processing, and a different authentication approach can be used for subsequent and/or repeated authentication (e.g., during the session, i.e., in-session). While in other embodiments, biometric information can be used for initial and subsequent authentication processing.

The authentication processor 140 can access at least one data storage system or device 142 (collectively "system authentication data 142") storing or having computer access to authentication information for one or more users. The system authentication data 142 includes user-specific biometric data. In various embodiments, the authentication processor 140 need not authenticate the user for the user device to access unprotected resources 132, e.g., systems, subsystems, and data not requiring privileges. In some cases, unprotected resources 132 can include standard applications, such as Web browsers, word processing applications, and other applications native to the user device and/or an organization.

Once a user is authenticated by the authentication processor 140, authorization to access protected resources 160 can be managed by the authorization processor 150. The authorization processor 150 can access at least one data storage system or device 152 (collectively "system authorization data 152") storing or having computer access to authorization information for one or more users. The authorization information preferably associates rights and/or privileges with specific protected resources 160, on a user-specific basis. Therefore, if a user is authenticated by the authentication processor 140, the authorization processor 150 then enables that user (via user device 110) to access specific protected resources 160 in accordance with the rights and privileges indicated by the system authorization data 152.

Protected resources 160 can include, as examples, one or more system, subsystem, application, function, and/or data. For example, in a hospital setting, health record information system (HRIS) applications and data can be protected resources 160. In such systems, for example, a doctor can only view health records for his or her own patients. The authentication processor 140 and authorization processor 150 collaboratively ensure that only the appropriate medical professional has access to certain patients' data (e.g., records and information). In other embodiments, the protected resources can include other types of sensitive information, whether personal, financial, business, government, or other information.

In this embodiment, the authentication processor 140 provides subsequent and/or repeated authentication, after initial authentication, in order to accomplish improved security with respect to the protected resources. That is, during a user's session via user device 110, the authentication processor 140 may authenticate the user a plurality of times. In various embodiments, authentication is accomplished using at least some biometric information from the biometric sensors 114, e.g., face recognition, voice recognition, and/or some other type of biometrics (e.g., eye movement, retinal, and/or fingerprint, thumbprint, or palm print).

It should be understood that while various functional elements, processors, and databases are shown in FIG. 1 as belonging to certain systems, the inventive concepts are not so limited. In various embodiments, those functions, processes, and databases can be differently distributed across the various representative systems shown. For example, in various embodiments the authentication processor and database, or portions thereof, could be on the user device 110 or a third party or external system 180. Similarly, in various embodiments the authorization processor and database, or portions thereof, could be on the user device 110 or a third party or external system 180. In various embodiments, the user device 110 and the authentication system 120 can operate in a client-server architecture, where and authentication system application could be hosted in the user device that communicates with the authentication system 120 and other external systems 180. In various embodiments, the authentication can form part of an enterprise system, servicing users across an organization. The authentication system can be distributed in many different manners, without departing from the inventive concepts.

Figure 2A:
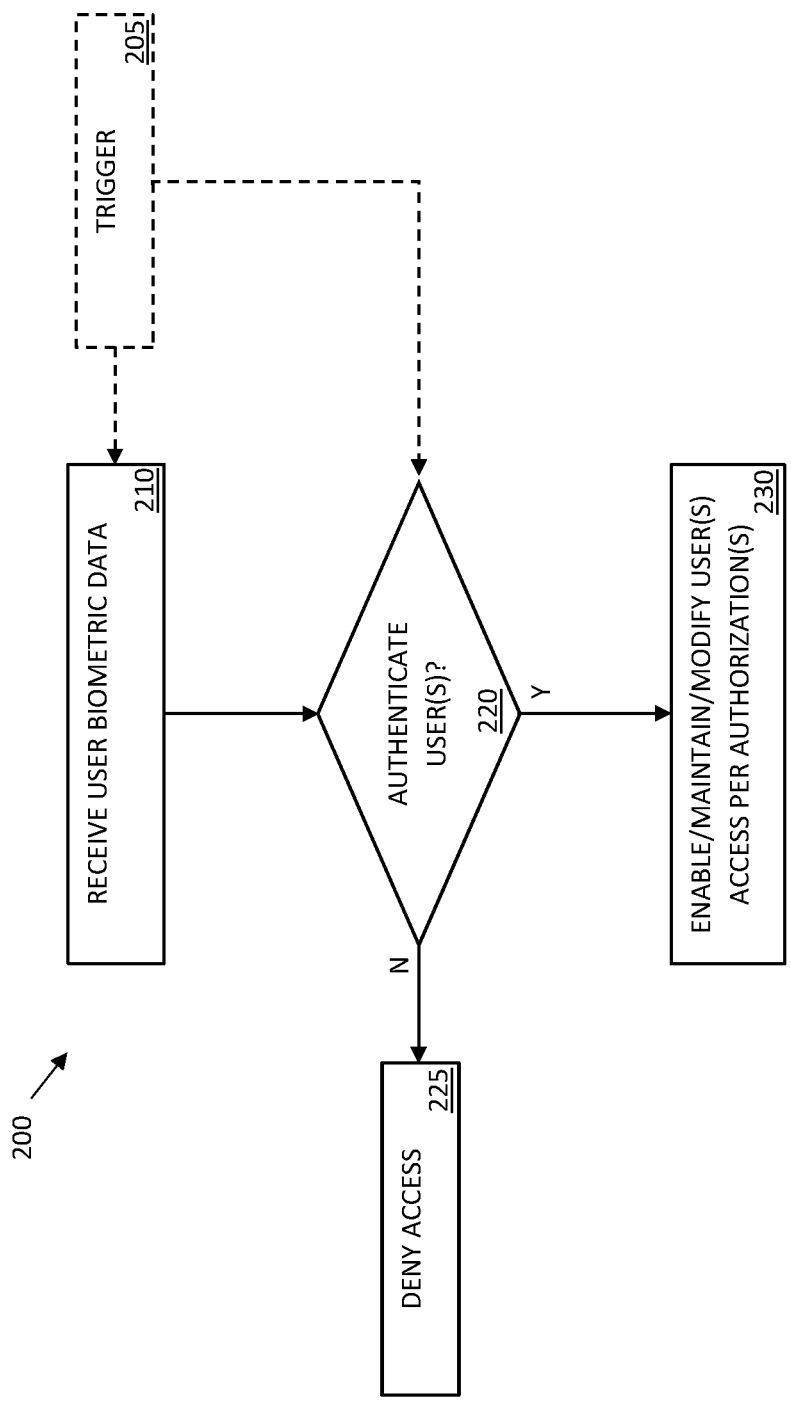
FIG. 2A is flow diagram representing an embodiment of an authentication method that can be performed by the system of FIG. 1, in accordance with aspects of the inventive concepts.

FIG. 2A is flow diagram representing an embodiment of an authentication method 200 that can be performed by the system of FIG. 1, in accordance with aspects of the inventive concepts. In step 210, the authentication system 120 receives user biometric data from the biometric sensors 114. In step 220, the received biometric data is used by the authentication processor 140, accessing the system authentication data 142, which includes system biometric data, to attempt to authenticate the user or users detected by the biometric sensors 114. If the user or users could not be authenticated in step 220, access to protected resources 160 is denied in step 225. Although, in some embodiments, access to unprotected resources may still be allowed. If the users were authenticated in step 220, then the method continues to step 230 where access to protected resources 160 is enabled in accordance with rights and privileges indicated by the authorization processor 150 for the authenticated user.

In various embodiments, receipt of biometric data in step 210 can be responsive to a trigger 205, as discussed above. The trigger 205 may instruct or cause the biometric sensors 114 to collect biometric data. In other embodiments, the trigger 205 may result from biometric data or changes in biometric data sensed by the biometric sensors. In response to a trigger 205, the authentication processor 140 can be configured to perform its authentication processes, such as in-session or subsequent authentication processes in step 220. In such cases, the trigger 205 could be based on received biometric data indicating the authenticated user is no longer present or that an unauthenticated user has become present. In other embodiments, the trigger could be based on changes in the system, functions, and/or data being accessed, or changes in authorizations of the authenticated user.

In the event that a new user becomes present, if the authentication processor 140 can authenticate the user in step 220, the authorization processor 150 will maintain (in step 230) the authorizations to the protected resources 160 if the new user has the same rights and privileges as the initially or previously authenticated user(s). However, if the new user is authenticated in step 220, but determined by the authorization processor 150 to have less privileges than the initially or previously authenticated user(s), then any content being output at the user device 100 for which all present authenticated users do not have authorizations will be obfuscated, closed, or otherwise made unavailable in step 230.

Figure 2B:
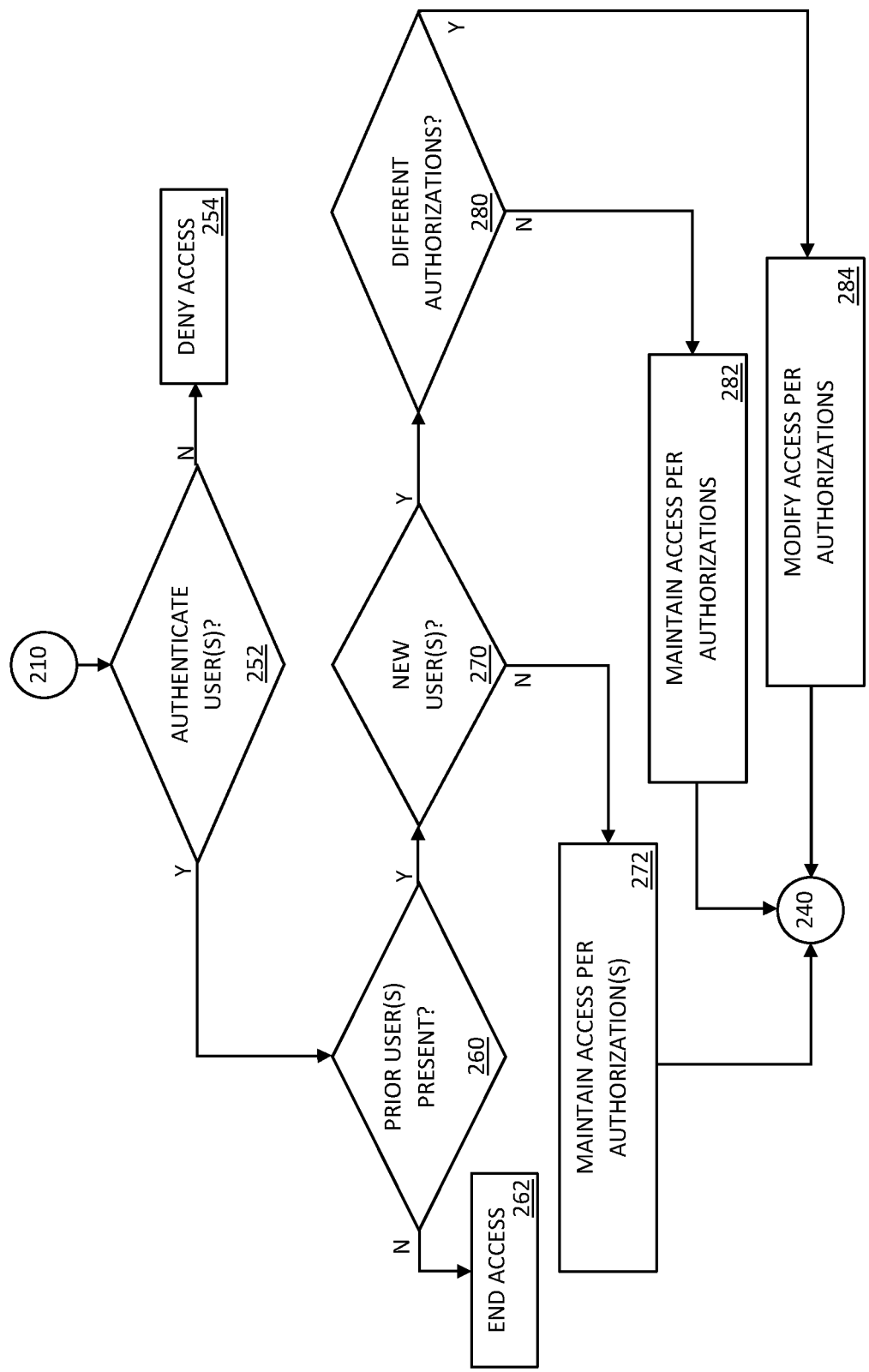
FIG. 2B is a more detailed embodiment of the authentication method of FIG. 2A, in accordance with aspects of the inventive concepts.

FIG. 2B is a more detailed embodiment of the authentication method of FIG. 2A, in accordance with aspects of the inventive concepts. In FIG. 2B, the authentication system 120 has received biometric data in step 210, via biometric sensors 114. The method proceeds to step 252 where the authentication processor 140 attempts to authenticate the user or users present, as indicated by the received biometric data. If the user(s) cannot be authenticated, access to protected resources 160 is denied in step 254, e.g., not displayed or available via the user device 110. But if the user or users were authenticated by the authentication processor in step 252, using biometric data, the method moves to step 260 to determine, based on the biometric data, if a prior, initially authenticated user is still present.

If there was a prior authenticated user having access to protected resources 160 and that user is no longer present, the prior authenticated user's access can be ended in step 262. But if a prior, initially authenticated user was determined to be present in step 260, the method moves to step 270 to determine if a new authenticated user is also present.

If a new authenticated user is not present, the method moves to step 272 where the prior and still present authenticated user's access is maintained. However, if a new authenticated user is determined to be present in step 270, the method moves to step 280, where it is determined by the authorization processor 150 if the new authenticated user has different authorizations that would not permit access to protected content being output on the user device 110, which is based on the prior authenticated user's authorizations. If the new authenticated user's authorizations allow access to content being output at the user device 110, the method moves to step 282 where the prior, authenticated user's access to the output content is maintained. However, if it is determined in step 280 that the new authenticated user is not authorized to access the content output at the user device 110, access to the output content, from the protected resources, is modified so that the only content output at the user device 110 is content for which all user present have authorizations. Of in some embodiments, the entire output at the user device 110 and/or access to the user device 110 can be suspended.

The processes exemplified by the methods of FIGS. 2A and 2B can be carried out by the authentication system 120 of FIG. 1. These authentication processes, which use biometric data, can be performed initially to gain access to protected resources (e.g., content) and subsequently, in-session, to continue access to protected resources. According to the methods, the processes can include real-time, continuous biometric monitoring with authentication also preformed continuously and in real (or near-real) time or in response to a trigger. The trigger can be the result of a clock (clock-driven) or an event detected through biometric monitoring or system monitoring (event-driven), or a combination thereof, as examples.

Figure 3:
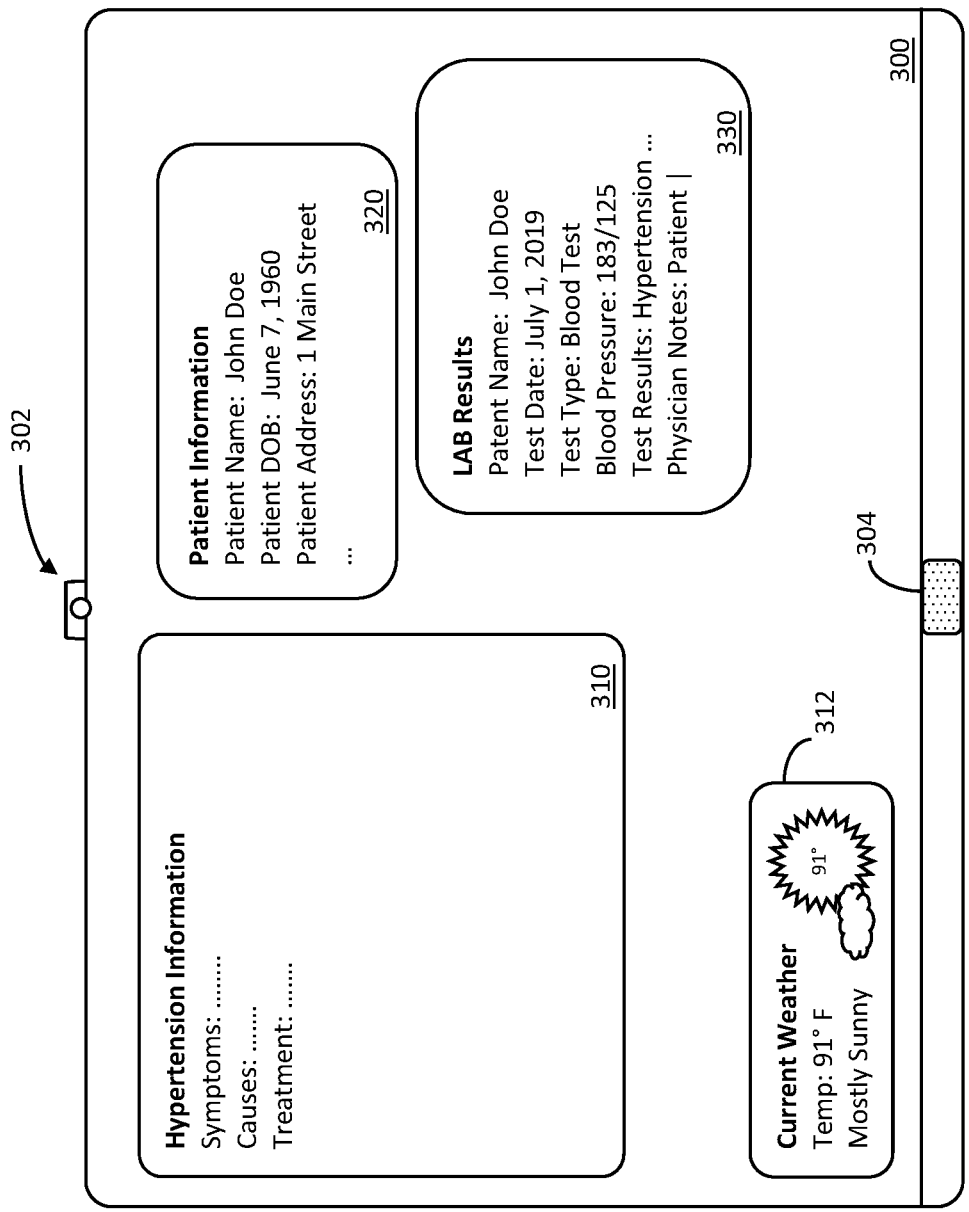
FIG. 3 is a depiction of an embodiment of a user interface that can be generated by the system of FIG. 1 and/or methods of FIGS. 2A and 2B, in accordance with aspects of the inventive concepts.

FIG. 3 is a depiction of an embodiment of a user interface at the user device 110 including content from the protected resources under the control of the authentication system 120 of FIG. 1 and/or methods of FIGS. 2A and 2B, in accordance with aspects of the inventive concepts. In FIG. 3, the device 110 includes a camera 302 and a microphone 304, which may be included proximate or within a display 300 as biometric input device 114. In device 110 other than phone or tablet embodiments, e.g., a laptop computer, a desktop computer, a terminal, an interactive display, an automated teller machine, a kiosk, a security system, an entertainment system, a gaming system, a television, or a vehicle, the display and camera 302 and/or microphone 304 may not be "included" together. Although FIG. 3 shows an embodiment having the camera 302 and the microphone 304 included in the display 300, one or both of the camera 302 and/or the microphone 304 may be discrete or separate from the display 300, in various embodiments.

Within the display, unprotected content 312 is shown, i.e., a window showing weather information. Also, content 310 having a first level of authorization is shown. And content, e.g., specific patient information, having a different authorization or rights is shown, in windows 320 and 330. The screen in FIG. 3 is generated to an initially authenticated user having the appropriate authorizations for access to the protected content in windows 310, 320, and 330. The authentication system 120 can run authentication processes during the user's session to ensure, for example, the user did not leave and/or another user did not arrive—which can be triggers based on changes in biometric data.

Figure 4:
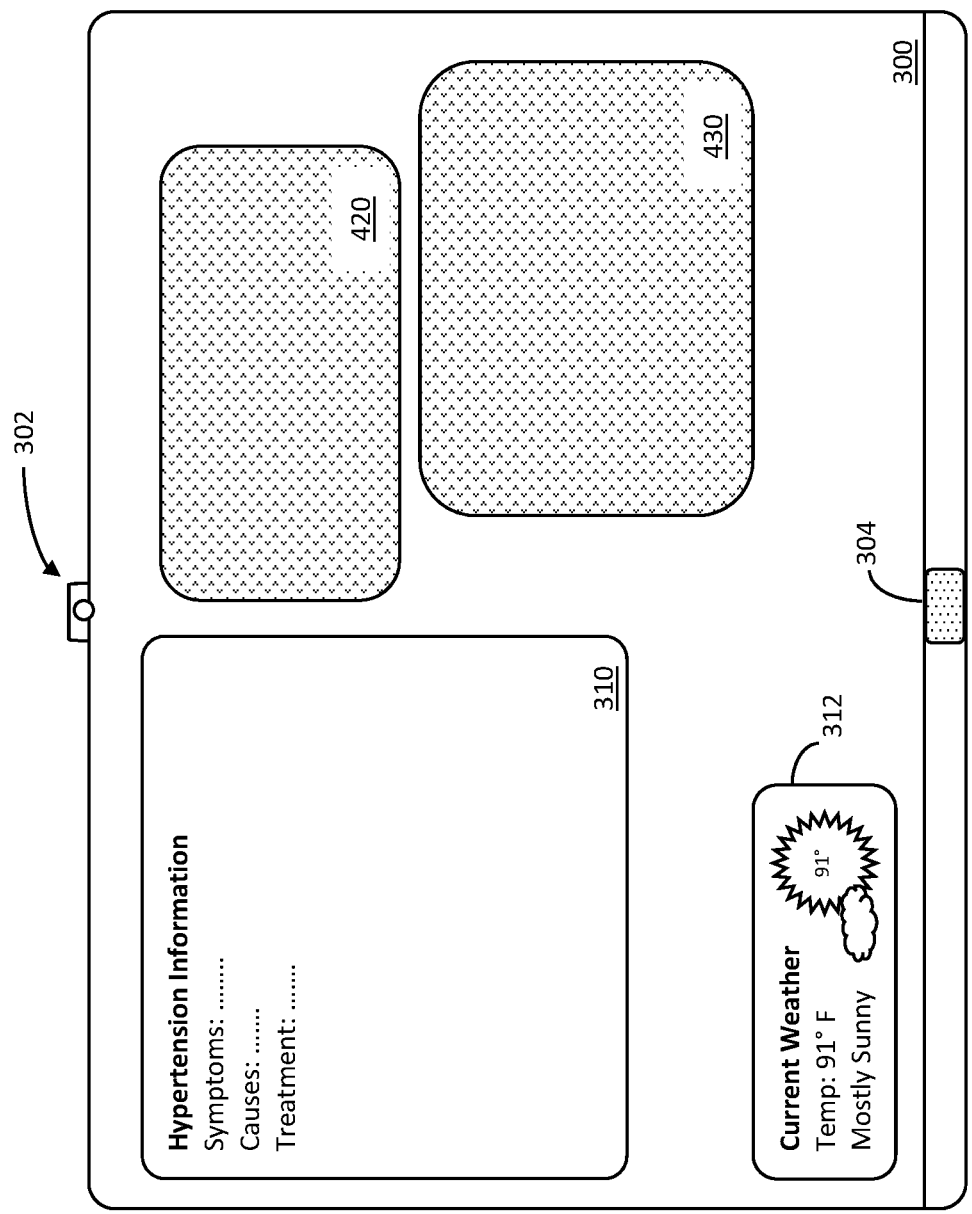
FIG. 4 is a depiction of an embodiment of the user interface of FIG. 3, in accordance with aspects of the inventive concepts.

FIG. 4 is an embodiment of the user interface of FIG. 3, in accordance with aspects of the inventive concepts, where a new user has arrived. Executing the methods of FIGS. 2A and/or 2B, the authentication processor 140 authenticated the new user, but the authorization processor adjusted to the output content according the rights of the new authenticated user, by obfuscating the content in windows 320 and 330 to generate obfuscated windows 420 and 430. That is, while the initially authenticated user had rights to view the content in windows 310, 320, and 330, the new authenticated user only had rights to view the contents of window 310, so the content of windows 320 and 330 is obfuscated.

In some embodiments, the obfuscated windows 420 and 430 can be automatically restored once the authentication system 120 determines that only authenticated users with the proper authorizations are present, based on the detected and sensed biometric data processing. In other embodiments, the obfuscated windows 420 and 430 can only be restored upon request, but only when authenticated users with the proper authorizations are present, based on the detected and sensed biometric data processing.

Figure 5:
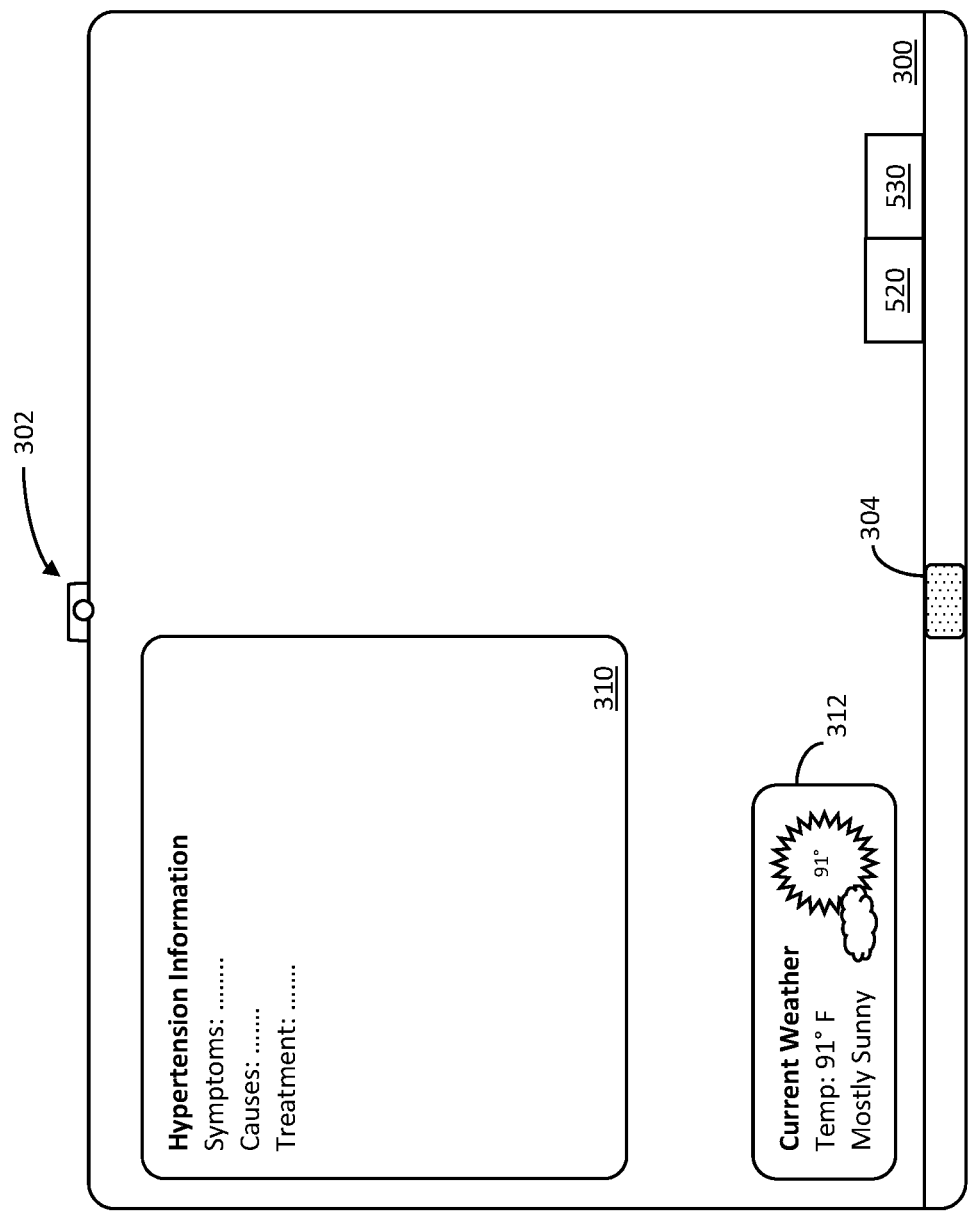
FIG. 5 is a depiction of another embodiment of the user interface of FIG. 3, in accordance with aspects of the inventive concepts.

FIG. 5 is another embodiment of the user interface of FIG. 3, in accordance with aspects of the inventive concepts. In this version of the display 300, the same authentication and authorization processing result as in FIG. 4 has occurred, but instead of obfuscating the content in windows 320 and 330, as obfuscated windows 420 and 430, the authentication system 120 has automatically caused windows 320 and 330 to be reduced to icons 520 and 530.

In some embodiments, the icons 520 and 530 can be automatically opened once the authentication system 120 determines that only authenticated users with the proper authorizations are present, based on the detected and sensed biometric data processing. In other embodiments, the icons 520 and 530 can only be opened upon request, but only when authenticated users with the proper authorizations are present, based on the detected and sensed biometric data processing.

Figure 6B:
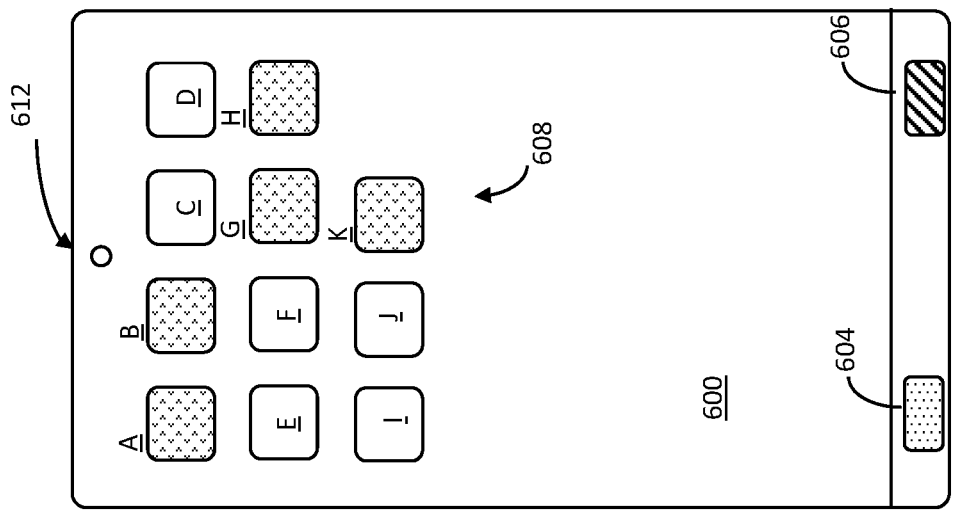
FIG. 6B is an embodiment of the mobile device user interface of FIG. 6A having some of the icons made inaccessible by the authentication system, in accordance with aspects of the inventive concepts.
Figure 6A:
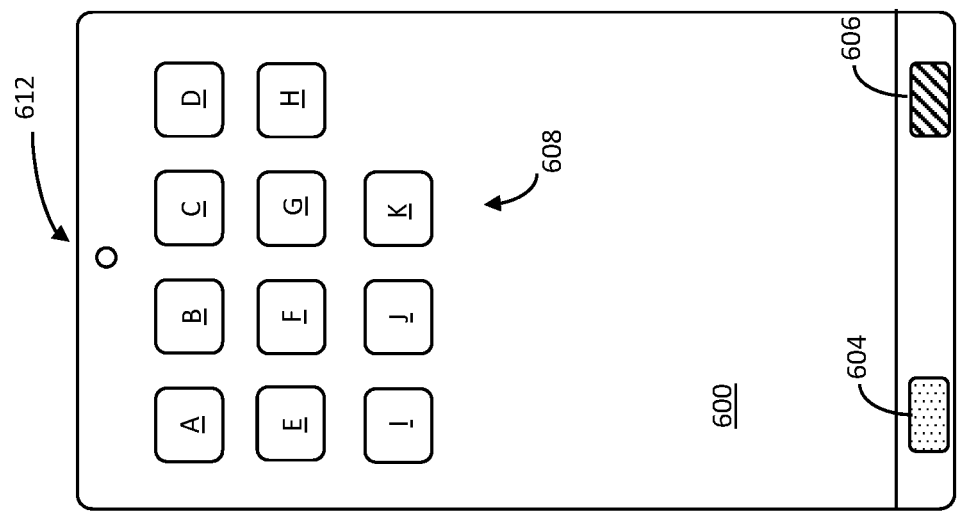
FIG. 6A is an embodiment of a mobile device user interface having a set of icons.

FIG. 6A is an embodiment of a mobile device user interface 600 having a set of icons 608 (icons A through K). The mobile device, in this embodiment, also includes at least one camera 612, at least one microphone 604, and at least one audio output 606. The camera 612 and/or microphone 604 can function as biometric sensors subject to control of the authentication system 120, as well as performing their native functions. The audio output 606 can include one or more of a speaker, a headphone jack, a Bluetooth connection for outputting audio to a Bluetooth speaker or headset or other means or devices for outputting audio signals to a user. The audio output 606 can perform its native functions, subject to override under control of the authentication system 120. The icons 608 can provide access to different applications or feeds. Such icons 608 can control access to a Web browser, email, one or more social media accounts, a back application, photographs, a chat application, a texting application, a home security application, a video game, an entertainment platform, and so on.

FIG. 6B is an embodiment of the mobile device user interface 600 having some of the icons made inaccessible by the authentication system 120, in accordance with aspects of the inventive concepts. For example, in FIG. 6B icons A, B, G, H and K have all been obfuscated (e.g., greyed-out) and disabled. In other embodiments, these icons could be visually removed from the interface 600.

In the embodiment of FIG. 6A, the authentication processor authenticated a user of the mobile device and provided access to all of icons 608. But in FIG. 6B, a subsequent authentication and authorization process was performed by the authentication system 120, thereby modifying the outputs and user accessibility of the mobile device. The change in the outputs of the mobile device reflects a change in the authorizations for the obfuscated icons A, B, G, H and K.

The obfuscation of icons A, B, G, H and K is driven by the authentication system, and could be responsive to any of a variety of changes detected by the biometric sensors and/or the mobile device. For example, if the originally authenticated user was no longer detected and/or or a new user was detected by the camera 612 and/or microphone 604, access to content and functionality at the mobile device can be altered, as dictated by the authentication and authorization processes. That is, icons and/or content is disabled or obfuscated when users are detected that are not authenticated and authorized to see or hear content or interact with icons (and the systems to which they link) via the screen and/or microphone.

In another embodiment, the authentication system 120 can play a role in parental controls implemented via the mobile device for a minor user, for example. For instance, if the parental controls dictate that certain applications and/or content are not to be made available to a minor user, those applications (icons) and/or content are disabled upon authentication of the user. In another example, if the parental controls dictate that the user should not have access to certain applications and/or content for certain periods of time, e.g., during school hours, during bedtime, and/or for more than a predetermined amount of time in a day, the authentication system can authenticate the user and disable the mobile device altogether or the forbidden applications and/or content according to the parental control parameters, wherein parental controls are authorizations that can be stored in the authorization database 152 and managed by the authorization processor 150. Authenticating and/or biometric monitoring of the user on the mobile device subsequently, after initial authentication of the user, enables time of use to be recorded. Other controls of the mobile device could be put in place and managed by the authentication system.

As noted above, the biometric-based authentication processes can run repeatedly in-session without any prompting or knowledge of the user(s) present. The system automatically adapts the output of protected content and/or access to protected resources in real time to achieve significantly improved safety and security. The system can be configured to optimize and/or minimize resource consumption associated with the ongoing authentication process, e.g., by performing biometric monitoring and/or authentication on a more event-driven or trigger basis, rather than on continuous basis. For example, continuous biometric monitoring with event-driven authentication processing can conserve resources, if needed.

In various embodiments, the inventive concepts can be implemented in a large number of areas that could use real-time biometrics for user authentication, including cases where keys or keyless devices are needed, as examples: 1) a driver steps up to a car and opens the door without any key or keyless system, wherein face recognition (or other biometric-based authentication) can be performed; 2) a driver sits behind the wheel of a vehicle, pushes a button start the vehicle and face recognition (or other biometric-based authentication) is performed enabling the vehicle to start and/or the vehicle to be put into drive, while driving, authentication using face recognition (or other biometric-based authentication) can be performed so that no key or keyless system is required to subsequently use the vehicle; or 3) a passenger, who is authorized to unlock a vehicle, but not drive (e.g., a minor), approaches the vehicle and the door unlocks using, for example, face recognition (or other biometric-based authentication), but the authentication does not enable the individual to start and/or drive the vehicle. In this latter example, the passenger is able to get into the vehicle, but the engine will not start or it can be enabled to start, but the vehicle cannot be driven. In various embodiments, authentication and authorization to start the vehicle can be accomplished through face recognition and/or finger print analysis, as examples, or using other forms of biometric-based authentication.

Implementation of the inventive concepts can be applied in healthcare processes, e.g., reading and writing patient records can be blocked for medical applications until the face looking at the screen or the voice in the room is authorized. Implementation of the inventive concepts can be applied to information technology (IT) processes. e.g., certain operations, files, data, and tasks can be blocked (not enabled) until the face looking at the screen is authorized, or other biometric-based authentication could be performed.

The inventive concepts can be implemented in a wide variety of end user devices, e.g., laptops and computers, mobile phones, tablets, kiosks, interactive displays, gaming consoles or equipment, ATMs, televisions, and so on. In entertainment or social media contexts, the inventive concepts can be applied to determine who is watching a display screen and, based thereon, whether or not access should be permitted or enabled for certain channels, web sites, programming, applications, targeted advertisements, purchasing content, and so on. For example, parental controls can be implemented on a cell phone to ensure that access to inappropriate content is not enabled when a minor is present. Parental controls can also be implemented on a television (e.g., cable or satellite) to ensure that access to inappropriate content is not enabled.

The inventive concepts can be implemented in a wide variety of secure facilities, such as schools, hospitals, prisons, military bases, prisons, government facilities, and so on. The inventive concepts can be implemented in a wide variety of online proctoring of exams and test taking. Other examples exist.

The inventive concepts can be implemented to remove humans from security functions, where there can be use of biometric data and authentications. The inventive concepts can remove the security burden on the user and ensure sensitive data and actions are safely accessed. In short, human actions can be removed form security and replaced with biometric monitoring and ongoing authentication. Systems and methods in accordance with the inventive concepts can be used on desktop applications, mobile devices, and/or Web applications (e.g., through a browser). Such systems and methods can be used in combination with or without credential-based login.

As will be appreciated by those skilled in the art, the inventive concepts can be implemented in a variety of scenarios. Attempting a login into a financial account, face recognition could be performed; the authentication could be subsequently performed using biometric data during the user's session. When an authenticated user has to abruptly leave his or her computer, subsequent real-time, continuous authentication ensures that sensitive data and/or applications will be obfuscated, hidden, closed or otherwise made in accessible. In an ambient clinical room, using a combination of face and voice biometrics recognition, as examples, a clinician's instructions are accepted and data is shown without inadvertently exposing protected patient data. If the authenticated clinician leaves the room, the data is hidden. If a person calls in to change a patient consultation dictation, but the voice is not recognized as the voice of the clinician, from processing of biometric voice data, the action can be rejected and the patient data remains safe.

In any of a variety of contexts, a user looks at his/her laptop, is authenticated, and starts working, and no credentials needed. Once the user looks away, the laptop can be automatically locked and, optionally, then unlocked when the user looks back, as determined by processing biometric data.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. An authentication method carried out by at least one computer processor executing computer program code, the method comprising:
   providing a computer system including system authentication information that includes biometric data for one or more users and authorization data associated with each of the one or more users, the authorization data indicating user rights associated with protected resources; and
   during a computer session:
   receiving biometric data from one or more biometric sensors for at least one user;
   authenticating the at least one user if the received biometric data corresponds to system biometric data;
   electronically enabling access to one or more of the protected resources by the at least one authenticated user based on system authorization data associated with the at least one authenticated user, wherein access includes at least one of visual and audio access; and
   if more than one user is authenticated while the at least one authenticated user has access to the protected resources, determining if any of the authenticated users is unauthorized to access the protected resources while the at least one authenticated user has access to the protected resources and, if so, disabling access to all of the protected resources for the at least one authenticated user based on the system authorization data associated with the any of the authenticated users unauthorized to access the protected resources, wherein disabling access includes disabling interaction to icons associated with the protected resources and one or more systems to which the icons link.

2. The method of claim 1, wherein receiving the biometric data for the at least one user includes intermittent monitoring for biometric data.

3. The method of claim 1, wherein receiving the biometric data for the at least one user includes continuous monitoring for biometric data.

4. The method of claim 1, wherein receiving the biometric data for the at least one user includes real-time monitoring for biometric data.

5. The method of claim 1, wherein authenticating the at least one user is responsive to a clock-driven trigger.

6. The method of claim 1, wherein authenticating the at least one user is responsive to an event-driven trigger.

7. The method of claim 6, wherein the event-driven trigger includes determining the presence of a new user based on the received biometric data and/or determining the absence of a previously authenticated user based on the received biometric data.

8. The method of claim 1, wherein the authenticating includes processing the received biometric data for at least one of voice recognition, face recognition, eye movement detection, retinal scan, and/or fingerprint, thumbprint, or palm print detection.

9. The method of claim 1, further comprising:
if more than one user is authenticated, determining if any of the authenticated users is a newly authenticated user and, if so, modifying access to the protected resources based on the system authorization data associated with the newly authenticated user.

10. The method of claim 9, further comprising:
outputting content from the protected resources to at least one display; and
the modifying or disabling access to the protected resources further includes obfuscating or closing at least some of the displayed content on the at least one display.

11. An authentication system, the comprising:
non-transitory computer storage including system authentication information that includes biometric data for one or more users and authorization data associated with each of the one or more users, the authorization data indicating user rights associated with protected resources;
at least one processor configured to repeatedly, during a computer session:
receive biometric data from one or more biometric sensors for at least one user;
authenticate the at least one user if the received biometric data corresponds to system biometric data;
electronically enable access to one or more of the protected resources by the at least one authenticated user based on system authorization data associated with the at least one authenticated user, wherein access includes at least one of visual and audio access; and
if more than one user is authenticated while the at least one authenticated user has access to the protected resources, determining if any of the authenticated users is unauthorized to access the protected resources while the at least one authenticated user has access to the protected resources and, if so, disabling access to all of the protected resources for the at least one authenticated user based on the system authorization data associated with the any of the authenticated users unauthorized to access the protected resources, wherein disabling access includes disabling interaction to icons associated with the protected resources and one or more systems to which the icons link.

12. The system of claim 11, wherein the at least one processor is configured to drive the biometric sensors to perform intermittent monitoring for biometric data.

13. The system of claim 11, wherein the at least one processor is configured to drive the biometric sensors to perform continuous monitoring for biometric data.

14. The system of claim 11, wherein the at least one processor is configured to drive the biometric sensors to perform real-time monitoring for biometric data.

15. The system of claim 11, wherein the at least one processor is configured to authenticate the at least one user in response to a clock-driven trigger.

16. The system of claim 11, wherein the at least one processor is configured to authenticate the at least one user in response to an event-driven trigger.

17. The system of claim 16, wherein the event-driven trigger includes a determination by the at least one processor of the presence of a new user based on the received biometric data and/or the absence of a previously authenticated user based on the received biometric data.

18. The system of claim 11, wherein the at least one processor is configured to process the received biometric data for at least one of voice recognition, face recognition, eye movement detection, retinal scan, and/or fingerprint, thumbprint, or palm print detection.

19. The system of claim 11, wherein the at least one processor is further configured to:
if more than one user is authenticated, determine if any of the authenticated users is a newly authenticated user and, if so, modify access to the protected resources based on the system authorization data associated with the newly authenticated user.

20. The system of claim 19, wherein the at least one processor is further configured to:
output content from the protected resources to at least one display; and
further modify or disable access to the protected resources by obfuscating or closing at least some of the displayed content on the at least one display.

* * * * *